United States Patent [19]

Barnett

[11] 4,422,045
[45] Dec. 20, 1983

[54] BARNETRON MICROWAVE AMPLIFIERS AND OSCILLATORS

[76] Inventor: Larry R. Barnett, 8221 Erika Dr., Manassas, Va. 22111

[21] Appl. No.: 245,759

[22] Filed: Mar. 20, 1981

[51] Int. Cl.³ .......................... H01S 1/00; H01J 23/16
[52] U.S. Cl. .......................................... 330/4; 313/62; 331/94.1
[58] Field of Search .................. 330/4; 313/62; 332/7; 315/3; 331/94

[56] References Cited

U.S. PATENT DOCUMENTS 3,883,761  5/1975  Hendry ................................. 313/62
4,224,576  9/1980  Grovatstien et al. .................... 330/4
4,253,068  2/1981  Barnett .................................. 330/4

OTHER PUBLICATIONS

Chu, "Theory of Electron Cyclotron . . . Harmonic Frequencies", 12/78, pp. 2354 to 2365, Phys. Fluids, vol. 21, #12.
Barnett, "Cyclotron Maser Instability in a Nonlinear Electrostatic Field", 1978, pp. 1–98, University of Tennessee, Ph.D. #7823306.
Sprangle et al., "The Non-Linear Theory . . . Electron Cyclotron Maser", 4/18/79, pp. 1–23, Opened Especially p. 21, NRL Memorandum 3982, NTFS A069461.

*Primary Examiner*—Nelson Moskowitz

[57] ABSTRACT

A cyclotron maser microwave amplifier and oscillator which utilizes non-relativistic electrons in cyclotron motion and a spatially nonlinear electrostatic field which is produced by the space charge of the electrons. The term "spatially nonlinear electrostatic field" encompasses static electric fields whose magnitude can be described mathematically as varying in a nonlinear manner as a function of position in one or more directions. As taught by U.S. Pat. No. 4,253,068 of Feb. 24, 1981, "Cyclotron Maser Using a Spatially Nonlinear Electrostatic Field", completely non-relativistic electrons may be used in principle for which phase bunching will occur due to the nonlinear motions induced by the electrostatic field, resulting in stimulated emission of cyclotron radiation for use in a microwave amplifier or oscillator. U.S. Pat. No. 4,253,068 teaches that appropriate nonlinear electrostatic fields can be established by suitably shaped electrodes and a low charge density electron beam. The present application teaches that appropriate nonlinear electrostatic fields can be produced by the self fields of the space charge of the electron beam. Resulting amplifiers and oscillators are here named barnetron amplifiers and oscillators.

An electron gun which produces an annular electron beam with components of velocity perpendicular and parallel to an axial magnetic field.

6 Claims, 5 Drawing Figures

ELECTRON GUN

INTERACTION REGION

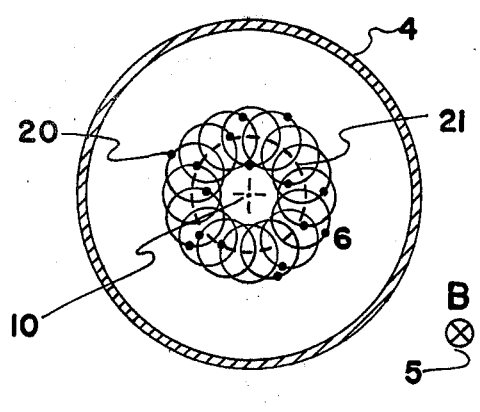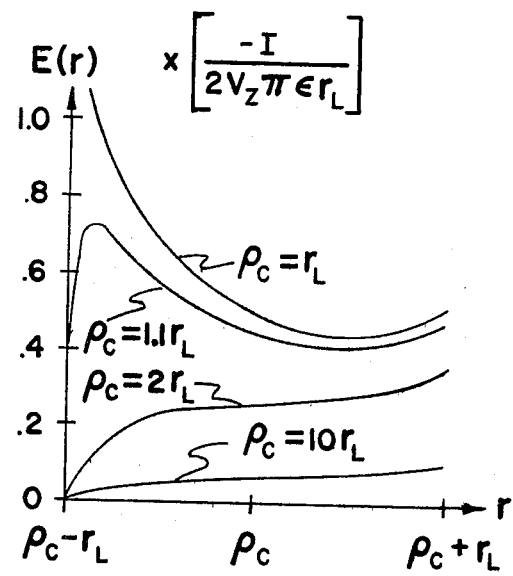
FIG. 2  FIG. 3
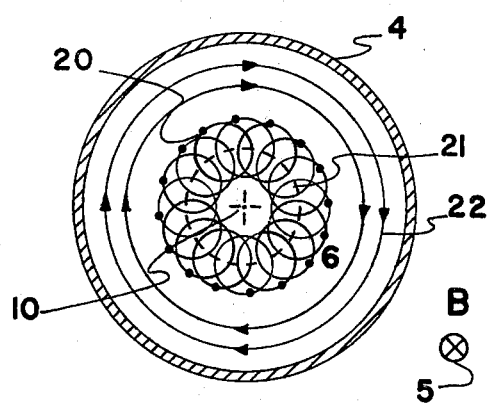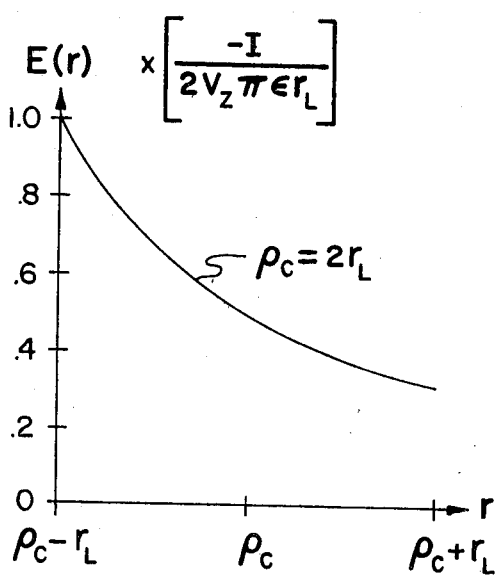
FIG. 4  FIG. 5

BARNETRON MICROWAVE AMPLIFIERS AND OSCILLATORS

BACKGROUND

This invention relates to the art of microwave generation and more specifically to the art of cyclotron maser amplifiers and oscillators in which stimulated coherent emission of microwave energy occurs by electrons in cyclotron motion in a magnetic field.

It is well known in the art, that in order for a system of free electrons in cyclotron motion to impart a net energy gain to an oscillating electromagnetic field or a wave, a phase bunching mechanism must exist. One such phase bunching mechanism is the relativistic effect of mildly relativistic electrons as taught by U.S. Pat. No. 3,398,376 by Hirschfield entitled "Relativistic Electron Cyclotron Maser". Relativistic electron cyclotron masers are commonly called gyrotrons. A second bunching mechanism is by the nonlinear motions induced by a nonlinear electrostatic field as taught by U.S. Pat. No. 4,253,068 by Barnett entitled "Cyclotron Maser Using a Spatially Nonlinear Electrostatic Field".

It is this second phase bunching mechanism (as described in U.S. Pat. No. 4,253,068) on which the present invention is based. The present invention is a result of the continued research of this topic by the applicant since the time of application of U.S. Pat. No. 4,253,068 and constitutes a significant improvement as will be disclosed in the following discussion. A detailed explaination and theory of the phase bunching mechanism is provided in the U.S. Pat. No. 4,253,068 which will not be repeated in the present disclosure. The reader is referred to U.S. Pat. No. 4, 253,068 and the thesis work of Larry R. Barnett presented at the University of Tennessee, June 1978, entitled "Cyclotron Maser Instability in a Nonlinear Electrostatic Field" for details of the theory and calculations. The results of the theory will be used here.

SUMMARY OF THE INVENTION

It is the principle object of this invention to provide a means of obtaining cyclotron maser amplification and oscillation by the use of the self-induced nonlinear electrostatic field of a system of electrons in cyclotron motion. A means of providing an electron beam is a second object.

Other objects and many of the attendant advantages of the present invention will be obvious to those skilled in the art from the following detailed description taken in conjunction with the drawings.

BRIEF DESCRIPTION OF THE DRAWINGS

FIG. 2 is an end view of unbunched electrons at the beginning of the interaction region.

FIG. 3 are plots of the electrostatic fields produced by unbunched electrons in the interaction region for several guiding center radii of an annular electron beam.

FIG. 4 is an end view of the electrons as phase bunched by a circular-electric waveguide mode.

FIG. 5 is a plot of the electrostatic field seen by an electron as produced by phase bunched electrons of an annular electron beam bunched by a circular-electric waveguide mode.

DETAILED DESCRIPTION

Figure 1:
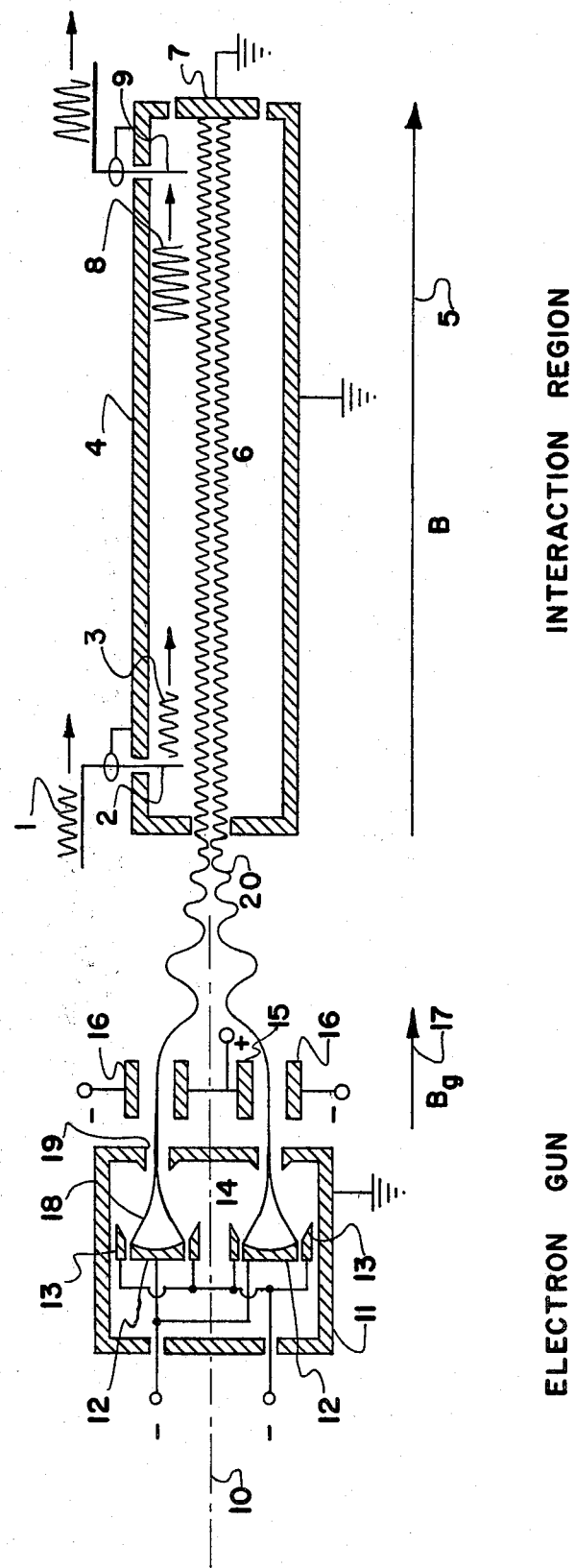
FIG. 1 is the diagram of an embodiment of the invention as an amplifier with the electron gun and interaction region.

Consider the electron beam 6 in the embodiment of the invention of FIG. 1. The electron beam is drifting with axial velocity through a uniform waveguide 4 and emersed in a uniform axial magnetic field 5 of strength B. This region is the interaction region in which the electron beam 6 and electromagnetic wave 3 interact. FIG. 2 is a cross section view of the interaction region showing a circular waveguide 4 and randomly phased (unbunched) electrons 20 on a constant guding center radius 21 as would occur upon initial injection of the electrons into the interaction region. The electrons initially all have a Larmor radius, $r_L$, due to their having perpendicular velocity to the magnetic field. Although a circular waveguide is illustrated here it is obvious that any cross sectional shape of waveguide can be used. For example, rectangular, ridge waveguide, etc. can be used. Any of the waveguide modes of a particular waveguide can, in principle, be used. For example, the $TE_{11}$ and $TE_{01}$ circular waveguide modes and the $TE_{10}$ rectangular and ridge waveguide modes are mentioned as being particularly useful but other modes are usable as well and may have special application.

The unbunched electrons in the annular beam geometry of FIG. 2, due to their having charge, and since there are very many electrons, creates a spatial charge distribution as a function of the radius, r, from the axis of the beam as given by $$\sigma(r) \simeq \frac{\sigma_c r_L \rho_c}{r[r_L^2 - (r - \rho_c)^2]^{\frac{1}{2}}}$$

where $\rho_c$ is the guiding center radius, $\sigma_c$ is the charge density of the electron beam at the guiding center radius, and $\sigma(r)$ is the spatial charge density as a function of r. The guiding center charge density is related to the beam current by $$\sigma_c = \frac{I}{2v_z \pi^2 r_L \rho_c}$$

where I is the total beam current and $v_z$ is the axial velocity of the electrons. For a known charge distribution the resulting electric field can be solved for, as well known in the art, and for this spatial distribution the electric field as a function of radius is given by $$E(r) \simeq \frac{I}{2v_z \pi^2 \epsilon r} \cos^{-1}\left(\frac{\rho_c - r}{r_L}\right)$$

where $\epsilon$ is the permittivity of vacuum. In FIG. 3 is plotted electrostatic fields for several values of guiding center radius as denoted. As seen in FIG. 3 that, for a given beam current, as the guiding center radius $\rho_c$ is decreased from $\rho_c = 10 r_L$ to $\rho_c = r_L$ the magnitude of the radial electrostatic E(r) increases. Most importantly is that the shape of the electrostatic field changes with guiding center radius. As taught by U.S. Pat. No. 4,253,068, what is required for nonisochronism to occur, and the system of electrons to have the capability of being phasebunched under the influence of an electromagnetic wave, is for the electrons to feel a much stronger perturbation in electrostatic field strength, from the guiding center value $E(\rho_c)$, on one side of the electron orbit than the other.

When an electrostatic field is applied to an electron, reguardless of the origin of the field, if the field is nonlinear then the above requirement is met. Then the length of time for an electron to complete an orbit cycle is dependent on its' energy and a system of these electrons are nonisochronous which can be phase bunched to produce amplification.

Specifically, as taught by U.S. Pat. No. 4,253,068, a uniform electrostatic field and a linear electrostactic field, i.e. one that varies proportionally to motion in one direction, do not meet the requirements. In general any electrostatic field that does vary as a nonlinear function of a direction of motion of the electron produces nonisochronism to some degree. However, for a significant effect to occur the nonlinearity must be strong.

Referring to FIG. 3, the electrostatic field shape for $\rho_c = 10 r_L$ is practically symmetrical about the guiding center and no phase bunching, or at best only weak bunching, is expected at the fundamental frequency. Increasing the space charge density such as by increasing the beam current will not change the shape of $E(r)$ and still no significant effect is expected at large guiding center radius. It is likely though that this field shape can induce significant bunching at the second cyclotron harmonic frequency.

At a smaller guiding center radius such as $\rho_c = 2 r_L$ of FIG. 3 the electrostatic field is not symmetrical and phase bunching of the electrons is expected. When the guiding center radius is made close to the Larmor radius the electrostatic field peaks on the inside of the orbit. The curve for $\rho_c = r_L$ is approximately the same shape as a $r^{-1}$, or radial field. The $r^{-1}$ electrostatic field is discussed in U.S. Pat. No. 4,253,068 and demonstrated by experiment. Note that the r=0 position on the horizontal axis is in different locations for the curves of FIG. 3. The case for small guiding center radius equal to or slightly larger than the Larmor radius allows the derivations of U.S. Pat. No. 4,253,068 for the radial field case to be applied directly. Of course, the corresponding design equations for any particular electrostatic field including the annular beam for when $\rho_c >> r_L, \rho_c > r_L, \rho_c \cong r_L$, and for the case where not all the electrons have exactly the same guiding center radius, other beam geometries, etc. can be derived using the principles taught in U.S. Pat. No. 4,253,068.

A particular interesting case is the use of circular-electric modes such as the $TE_{01}$, $TE_{02}$, etc. For the $TE_{0n}$ modes the circular symmetry produces phase bunched electrons as shown in FIG. 4 where circular r.f. field lines 22 are depicted for the $TE_{01}$ mode. The electrice field for this phase bunching as seen by a rotating electron is $$E(r) \cong \frac{I}{2 v_z \pi \epsilon r},$$

where r is the radial position of the electron, which is exactly a $r^{-1}$ field for any guiding center. The equation is plotted in FIG. 5 for $\rho_c = 2 r_L$. Also of importance is to note that the electric field in the phase bunched condition of FIG. 4 is no longer static. To a fixed point in the region of the electrons the electric field is oscillating at the orbit frequency of the electrons. However, the field on the electrons is the same as a static field of the above equation where r is the radius of a point not moving with the electrons. Hence, the electric field of the phase bunched electrons is still called 'electrostatic' here even though the field is not truly static. The same phenomena also occurs with any other waveguide mode for phase bunched electrons, but for other than $TE_{0n}$ modes the bunching is not circular symmetric and the electric fields are more complex.

For the case of small guiding center radius, i.e. $\rho_c \cong r_L$, of FIG. 3, the electrostatic field shape and amplitude over most of the electron orbit is approximately the same shape as the $r^{-1}$ field at $\rho_c = 2 r_L$ of FIG. 5. This allows the use of the radial field derivations of U.S. Pat. No. 4,253,068 with $\rho_c = 2 r_L$ applied in the equations to estimate the starting conditions for amplification of the present invention when $\rho_c \cong r_L$. In the case of the $TE_{0n}$ modes, as bunching progress the electrostatic field shape becomes even closer to the $r^{-1}$ shape and, in fact, the field amplitude becomes stronger which in turn increases the bunching forces.

The orbit frequency of the electrons is a function of the perpendicular velocity of the electrons and is given by $$\omega_o = \omega'_c \left[ 1 + \frac{v^2}{\eta} \right]^{\frac{1}{2}}$$

where v is the perpendicular (to axial magnetic field) velocity of the electrons, $\omega_c'$ is the modified cyclotron frequency $$\omega'_c = \omega_c^2 - \frac{e E_c}{m \rho_c},$$

where $E_c$ is the electrostatic field strengh at the guiding center radius $E_c = E(\rho_c)$, and $\omega_c$ is the unperturbed cyclotron frequency $$\omega_c = \frac{eB}{m}$$

where m is the electron mass, e is the electron charge, and $$\eta = -\frac{4 m \rho_c^3 \omega_c^4}{3 e E_c}.$$

As taught by U.S. Pat. No. 4,253,068 when the orbit frequency is a function of the perpendicular velocity of the electrons then phase bunching occurs and with proper phasing to the electromagnetic wave then amplification occurs. The criteria for amplification to occur, i.e. starting condition, for a $r^{-1}$ field is approximately given by $$\frac{\omega_c \tau v^2}{|\eta|} = \frac{3 \tau v^2 |e E_c|}{4 m \rho_c^3 \omega_c^3} > 1,$$

where $\tau$ is the interaction time between the electrons and the electromagnetic wave, and $|e E_c|$ is the magnitude of the force of the electrostatic field on the electrons at the guiding center radius. Since $$E_c \cong \frac{I}{4 v_z \pi \epsilon r_L}$$

for the case of $r \simeq \rho_c$, then the starting condition becomes $$\frac{3\tau\omega_c|eI|}{128v^2 v_z m\epsilon} > 1,$$

where $\rho_c = 2r_L$ was substituted in $\rho_c^3$ by reason of the previous arguements. Under this condition that the guiding center radius be kept proportional to the Larmor radius has a significant implication. For a given perpendicular velocity, the relation improves and the growth rate increases proportional to the cyclotron frequency. This implies that the present invention works better as the operating frequency is increased making it attractive for a millimeter or submillimeter wavelength amplifier. This is a result that is physically reasonable since as the cyclotron frequency is increased, for a given beam current and perpendicular and parallel velocity, the space charge potential depression at the center of the beam is not changed even though the electrostatic field is increased as the Larmor radius and guiding center radius are decreased inversely with frequency.

It is not physically reasonable to decrease the perpendicular velocity and improve the growth since in high density beams the current would decrease very rapidly such that the growth rate is reduced. Also, less energy would be available thus reducing the power output.

It is now clear why the present invention is an improvement on U.S. Pat. No. 4,253,068 where a center wire electrode is used to establish the radial field. The presented embodiment of U.S. Pat. No. 4,253,068 at a frequency of 10 GHz requires a beam guiding center radius the order of ½ millimeter. Therefore, the center wire electrode is small and the positioning of the center electrode to the axis of the annular beam requires precise alignment. As the frequency is increased then the guiding center radius must be decreased making the alignment more difficult. The present invention requires no center electrode therefore eliminating the alignment problem. Second, as the guiding center is decreased the space charge fields increase then helping to relax the requirement of using smaller beams for higher frequency operation, or alternately, if smaller beams are used then the growth rate is enhanced at higher frequency. Third, the electrostatic field strengths require a high density electron beam therefore inherently using a much higher beam current which implies a capability for a much higher microwave power output.

It is obvious that both the electrostatic field of electrodes and the self fields of an electron beam can be used together advantageously to enhance the overall field strength and shape and, hence, amplification. An example would be using the annular beam of FIG. 2 with strong space charge fields together with a negatively biased wire electrode on the axis.

In principle, amplification can take place with proper synchronism and phasing of the beam cyclotron motion with any waveguide mode at frequencies above the waveguide cutoff frequency, however, stronger interaction will take place for frequencies near the cutoff frequency. This is because as the cutoff frequency of a waveguide is neared the group velocity of the wave decreases and the wave field amplitude increases rapidly for a given input power. The result is a greatly enhanced wave growth rate for frequencies just above cutoff as compared to frequencies well above cutoff.

It should also be noted that, while it is attractive to make the space charge fields as strong as possible from an amplification point of view, attempting to make the space charge fields too strong will result in beam generation and propagation problems. A proper design must take into consideration both the interaction of beam and wave and the beam generation simultaneously.

In principle this mechanism exists for very low energy electrons. However, to be a practical amplifier it is desirable that the amplifier produce useful microwave power input. Considering practical beam currents that can be produced for a given accelerating voltage, i.e. realizable perveance, to produce power outputs on the order of watts to tens of watts then requires the beam electrons to have energy on the order of hundreds of electron-volts and for power outputs on the order of hundreds of watts requires the beam electrons to have energy on the order of one to several thousand electron-volts. Relativistc effects begin to enter as the energy is raised in the keV range. Because of the different phasing requirements for the relativistic bunching and the bunching mechanism of the present invention, the effect of the weakly relativistic electrons is to actually degrade the bunching of the present invention. Conversely, at much higher energies, i.e. 25–100 keV, where the relativistic bunching mechanism dominates in conventional gyrotrons, the effect of the space charge forces will degrade the relativistic bunching.

Obviously, it is possible to design high power barnetron amplifiers and oscillators using electron energies that can be considered mildly relativistic. In that case, applying the criteria for both mechanisms, when $$|\eta| > C^2$$

then the barnetron bunching mechanism dominates over the relativistic bunching and the device is clearly an embodiment of the present invention with the effect of mildly relativistic electrons serving as a degradation to the bunching as explained. It is possible with some electron beam and electrode configurations that the two bunching mechanisms can enhance each other to form a combined bunching mechanism which can result in stronger amplification than which either could result independently. Such a condition, i.e. where both the barnetron and relativistic bunching mechanisms both have significant and favorable contributions to the overall bunching and amplification is then a form of hybrid amplifier or oscillator.

An amplifier employing the bunching mechanism of the present invention by using an annular electron of small guiding center radius with strong space charge fields is shown in section view in FIG. 1. FIG. 1 consists of two distinctive parts, the interaction region where the microwave amplification takes place and the electron gun which produces the required small guiding center radius electron beam. An input wave 1 is launched by an input coupler 2 in a propagating waveguide mode 3 of waveguide 4. Although probe couplers are depicted here, in general the couplers may be any type of probe or waveguide coupling suitable for the mode in use. A uniform magnetic field 5 is axial with waveguide 4. The annular helical electron beam 6 travels with axial velocity through waveguide 4 to collector 7. The collector 7 may be placed at the end of the interaction waveguide 4 or outside and may be depressed with a negative potential as well known in the art. The perpendicular velocity of the cyclotron motion of the electrons 20 of the electron beam 6 is comparable to or greater than the axial velocity of the electrons 20. The guiding center radius of the electrons is made sufficiently small and the beam charge density is made sufficiently large such that the starting condition is met. Then for synchronism of the cyclotron beam mode to the propagating electromagnetic wave with proper phasing (or slip), amplification of the electromagnetic wave will occur. The amplified wave 8 is coupled out by output coupler 9.

Electron guns which are capable of producing annular helical electron beams are the magnetron injection gun, field reversal guns, and tilt angle guns are known in the art. A new electron gun especially suitable for producing the required small radius annular electron beam is shown in FIG. 1 and comprises the remaining parts. The sectional view of the gun is axis-symmetric about the axis 10. The gun comprises a magnetic shield 11, an electron emitting cathode 12, focusing electrodes 13 and 14, deflection electrodes 15 and 16, and a gun magnetic field 17 of strength $B_g$. The gun magnetic field 17 is axial and does not penetrate the shield 11. The gun magnetic field strength $B_g$ is lower than the interaction magnetic field strength B which smoothly and monotonically rises to the interaction magnetic field strength B. The cathode 12 and focus electrodes 13 and 14 are biased at negative potentials with respect to ground. The system of FIG. 1 is enclosed in a vacuum chamber where all gases have been evacuated to suitable vacuum tube pressure. The vacuum chamber is not shown for clarity of the gun and interaction parts. Electrons 18 emitted from cathode 12 converge and pass through annular aperature 19 and enter the axial gun magnetic field 17. The electrons then pass between ring deflection electrodes 15 and 16 where deflection electrode is biased with a positive potential and deflection electrode 16 is biased negative. This imparts a perpendicular velocity and the electrons begin oscillating in helical cyclotron motion with the cyclotron frequency of the gun magnetic field. As the electrons travel into the increasing magnetic field they undergo compression, as well known in the art, until they reach the interaction magnetic field 5 where the electrons 20 have the required guiding center radius, perpendicular velocity, and space charge fields.

Although only uniform magnetic fields and uniform waveguides in the interaction region have been discussed, it is obvious that interaction can take place in a non-uniform or tapered axial magnetic field and/or with a non-uniform or tapered waveguide. Benifits will be enhancement of efficiency and increasing the bandwidth.

An oscillator can be made out of the basic configuration of FIG. 1 by removing the input coupler 2 and decreasing the output coupling of the output coupler to form a cavity resonator of sufficient Q. Since high gain is not needed in an oscillator the length of the waveguide cavity can generally be made shorter than the amplifier interaction waveguide. It is also obvious that by physically changing a dimension of the waveguide a tuneable oscillator is realizable.

As outlined in U.S. Pat. No. 4,253,068 and the thesis by Barnett, the orbital motion is strong in harmonic components. Therefore, interaction and then amplification or oscillation can take place at cyclotron harmonics of the magnetic field. This increases the possible operating frequency for a given magnetic field strength. Optimum electrostatic field requirements and waveguide modes are likely to be different for harmonic frequency operation than for fundamental frequency operation.

It is obvious that many objects and embodiments of the present invention are realizable to those skilled in the art.

I claim:

1. An amplifying maser device utilizing a spatially nonlinear electrostatic field to induce stimulated cyclotron emission of radiation by electrons which comprises; a fast-wave propagating electromagnetic waveguide to support the wave, an input and output coupling means, a means of producing a magnetic field in the said waveguide, a means of injecting electrons with components of velocity parallel and perpendicular to the said magnetic field wherein the spatial distribution of the electrons produces the spatially nonlinear electrostatic field where the said spatially nonlinear electrostatic field is defined to be an electric field which is described as: the magnitude of the said electric field having a nonlinear variation as a function of position in one or more directions and serves to cause an electron moving in cyclotron orbits, in said magnetic field and said electric field, to have its cyclotron orbit to be modified and the cyclotron resonance frequency to be modified where the said resonance frequency is a function of the magnitude of the said orbit.

2. The device of claim 1 as an oscillator where the said waveguide is a waveguide cavity resonator.

3. The device of claim 1 where multiple waveguides and waveguide cavity resonators are utilized in amplifying or oscillating configurations.

4. The device of claim 1 where the said nonlinear electrostatic field is produced by both the space charge distribution of the electrons and electrodes.

5. The device of claim 1 wherein the frequency of operation is at a harmonic of the cyclotron frequency.

6. The device of claim 1 in which the said injected electrons have sufficient energy to be relativistic such that: the cyclotron frequency is a function of the magnitude of the cyclotron orbit due to the combined action of the said nonlinear electrostatic field and the relativistic mass dependence of the said injected electrons.

* * * * *